United States Patent
Syed et al.

(10) Patent No.: US 11,150,879 B2
(45) Date of Patent: Oct. 19, 2021

(54) METHOD AND SYSTEM FOR CONFIGURING PROCESSES OF SOFTWARE APPLICATIONS USING ACTIVITY FRAGMENTS

(71) Applicant: OPEN TEXT CORPORATION, Waterloo (CA)

(72) Inventors: Ashraf Ali Syed, Bangalore (IN); Sachin Gopaldas Totale, Pleasanton (CA); Satyapal Reddy, San Ramon, CA (US); Swathi Natarajan, Bangalore (IN); Prasad Kumar Thotakura, Bangalore (IN)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

(21) Appl. No.: 16/835,200

(22) Filed: Mar. 30, 2020

(65) Prior Publication Data

US 2020/0225916 A1     Jul. 16, 2020

Related U.S. Application Data

(63) Continuation of application No. 15/877,121, filed on Jan. 22, 2018, now Pat. No. 10,606,567, which is a continuation of application No. 14/871,523, filed on Sep. 30, 2015, now Pat. No. 9,898,261.

(51) Int. Cl.
*G06F 8/35*     (2018.01)
*G06F 8/60*     (2018.01)
*G06F 9/445*     (2018.01)

(52) U.S. Cl.
CPC ............ *G06F 8/35* (2013.01); *G06F 8/60* (2013.01); *G06F 9/44505* (2013.01)

(58) Field of Classification Search
CPC .......... G06F 8/35; G06F 8/60; G06F 9/44505
See application file for complete search history.

(56) References Cited

U.S. PATENT DOCUMENTS

| | | | |
|---|---|---|---|
| 5,408,665 | A | 4/1995 | Fitzgerald |
| 5,603,027 | A | 2/1997 | Ohkami |
| 5,966,533 | A | 10/1999 | Moody |
| 5,978,585 | A | 11/1999 | Crelier |
| 6,112,024 | A | 8/2000 | Almond et al. |
| 7,020,880 | B2 | 3/2006 | Mellen-Garnett et al. |
| 7,032,174 | B2 | 4/2006 | Montero et al. |

(Continued)

OTHER PUBLICATIONS

Office Action issued for U.S. Appl. No. 14/871,523, dated Mar. 9, 2017, 26 pages.

(Continued)

*Primary Examiner* — Douglas M Slachta
(74) *Attorney, Agent, or Firm* — Sprinkle IP Law Group

(57) ABSTRACT

A method for creating processes in a software application. The method includes obtaining an activity fragment. The activity fragment includes an activity fragment name and an activity fragment configuration. The method further includes obtaining a process specification specifying an activity, and obtaining activity configuration instructions. The activity configuration instructions specify inclusion of the activity fragment in the activity. The method also includes building, based on the process specification, a process. Building the process includes associating the activity fragment with the activity.

20 Claims, 7 Drawing Sheets

(56) References Cited

U.S. PATENT DOCUMENTS

| | | | |
|---|---|---|---|
| 7,210,125 B2 | 4/2007 | Chang et al. | |
| 7,500,220 B1 | 3/2009 | Feng et al. | |
| 7,624,393 B2 | 11/2009 | Egan et al. | |
| 7,739,676 B1 | 6/2010 | Karr et al. | |
| 8,015,541 B1* | 9/2011 | Srinivasan | G06Q 10/107 |
| | | | 717/104 |
| 8,091,069 B2 | 1/2012 | Rojer | |
| 8,255,901 B2* | 8/2012 | Halbedel | G06F 8/20 |
| | | | 717/174 |
| 8,286,198 B2* | 10/2012 | Munshi | G06F 9/4843 |
| | | | 719/328 |
| 8,381,176 B1 | 2/2013 | Bentley et al. | |
| 8,510,750 B2 | 8/2013 | Rodgers et al. | |
| 8,850,411 B2 | 9/2014 | Kelem et al. | |
| 9,898,261 B1 | 2/2018 | Syed et al. | |
| 9,992,072 B1 | 6/2018 | Chen et al. | |
| 10,606,567 B2 | 3/2020 | Syed et al. | |
| 2003/0159135 A1 | 8/2003 | Hiller et al. | |
| 2005/0132346 A1* | 6/2005 | Tsantilis | G06F 8/71 |
| | | | 717/168 |
| 2006/0074736 A1 | 4/2006 | Shukla et al. | |
| 2006/0200815 A1 | 9/2006 | Li | |
| 2008/0141234 A1* | 6/2008 | Becker | G06F 8/36 |
| | | | 717/162 |
| 2008/0178165 A1* | 7/2008 | Baker | G06F 8/45 |
| | | | 717/149 |
| 2008/0313599 A1 | 12/2008 | Carteri et al. | |
| 2009/0282401 A1* | 11/2009 | Todorova | G06F 8/61 |
| | | | 717/175 |
| 2010/0083218 A1* | 4/2010 | Bender | G06F 8/35 |
| | | | 717/106 |
| 2010/0100829 A1 | 4/2010 | Laberge et al. | |
| 2010/0235813 A1 | 9/2010 | Manczak et al. | |
| 2012/0036493 A1 | 2/2012 | Moosmann et al. | |
| 2012/0110546 A1 | 5/2012 | Jo et al. | |
| 2012/0311547 A1* | 12/2012 | DeAnna | G06F 8/60 |
| | | | 717/140 |
| 2013/0042226 A1 | 2/2013 | Glick et al. | |
| 2013/0111454 A1 | 5/2013 | Kojima | |
| 2014/0026118 A1* | 1/2014 | Dangeville | G06F 8/70 |
| | | | 717/121 |
| 2014/0059517 A1* | 2/2014 | Premkumar | G06F 8/34 |
| | | | 717/105 |
| 2014/0068588 A1 | 3/2014 | Tan et al. | |
| 2014/0282431 A1 | 9/2014 | Delio | |
| 2015/0100945 A1 | 4/2015 | Nadar et al. | |
| 2018/0143811 A1 | 2/2018 | Syed et al. | |

OTHER PUBLICATIONS

Notice of Allowance issued for U.S. Appl. No. 14/871,523, dated Oct. 6, 2017, 20 pages.

Office Action issued for U.S. Appl. No. 15/877,121, dated May 29, 2018, 27 pages.

Office Action issued for U.S. Appl. No. 15/877,121, dated Dec. 27, 2018, 35 pages.

Office Action issued for U.S. Appl. No. 15/877,121, dated May 1, 2019, 49 pages.

Notice of Allowance issued for U.S. Appl. No. 15/877,121, dated Nov. 19, 2019, 58 pages.

* cited by examiner

METHOD AND SYSTEM FOR CONFIGURING PROCESSES OF SOFTWARE APPLICATIONS USING ACTIVITY FRAGMENTS

CROSS-REFERENCE TO RELATED APPLICATION(S)

This application is a continuation of, and claims a benefit of priority under 35 U.S.C. 120 of, U.S. patent application Ser. No. 15/877,121, filed Jan. 22, 2018, entitled "METHOD AND SYSTEM FOR CONFIGURING PROCESSES OF SOFTWARE APPLICATIONS USING ACTIVITY FRAGMENTS", now U.S. Pat. No. 10,606,567, which is continuation of, and claims a benefit of priority under 35 U.S.C. 120 of, U.S. patent application Ser. No. 14/871,523, filed Sep. 30, 2015, entitled "METHOD AND SYSTEM FOR CONFIGURING PROCESSES OF SOFTWARE APPLICATIONS USING ACTIVITY FRAGMENTS", now issued as U.S. Pat. No. 9,898,261, the entire contents of which are hereby expressly incorporated by reference for all purposes.

BACKGROUND

Software application development is a complex task. The development of software applications typically involves the generation of a significant amount of source code by developers.

DETAILED DESCRIPTION

Figure 1A:
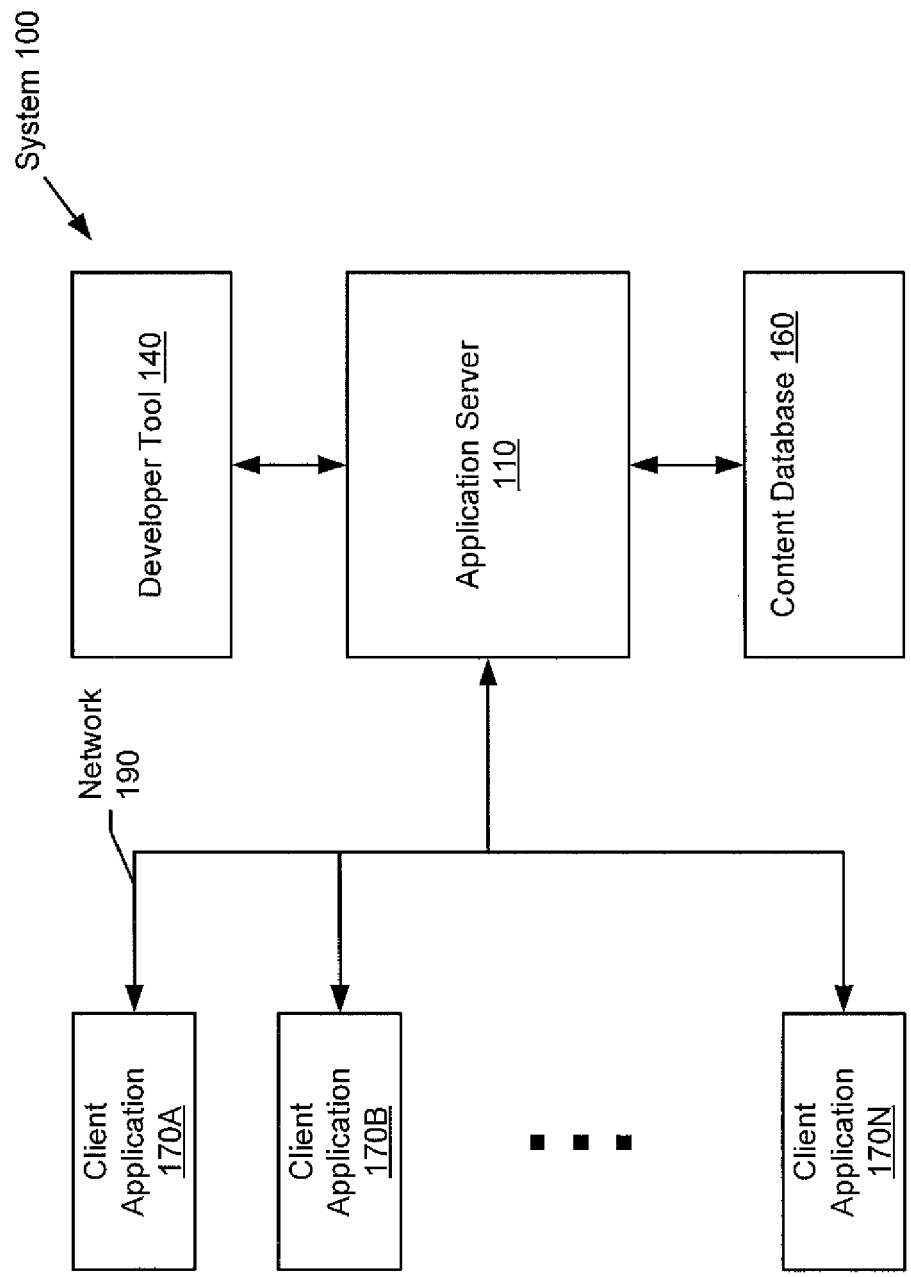
FIGS. 1A-1C show systems in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to methods and systems enabling the reuse of code fragments in a software application. The software application may be, for example, an enterprise content management (ECM) system or an enterprise resource planning (ERP) system, where users may access data from the central and/or distributed data storage. In one or more embodiments of the technology, processes are used to enable a user to access and manipulate data.

A process, in accordance with an embodiment of the technology, includes software instructions in the form of non-transitory computer readable program code designed to complete an operation that may include multiple tasks. A process may therefore be segmented into a series of activities. Each activity may perform one or more tasks, and an activity may thus include software instructions for performing a particular task. In one or more embodiments of the technology, multiple activities (within the same process, and/or across processes of the software application) may have common elements, i.e., they may include identical or similar software instructions.

In one or more embodiments of the technology, activity fragments that include the common elements may be established. An activity fragment may then be inserted into activities that include the common element provided by the activity fragment, rather than implementing the common elements separately in each activity. Accordingly, the software instructions implementing the common elements may only be created once in the activity fragment, rather than requiring repeated, separate implementations for each activity that includes the common elements.

In one or more embodiments of the technology, processes (also referred to as workflow) may be designed by an application designer. A process may be graphically designed in a developer tool, where the application designer generates a process specification by selecting activity templates from a template library, for example, by dragging and dropping the activity templates in a graphical user interface. Subsequently, the application designer may configure and interconnect the selected activity templates, in order to obtain the desired activities, before building and deploying the process, according to the process specification. In one or more embodiments of the technology, configuring an activity template may include inserting an activity fragment into the activity template being configured. The details of designing and building processes using process specifications is described below with reference to FIGS. 2-4.

FIG. 1A shows a schematic diagram of a system in accordance with one or more embodiments of the technology. Specifically, FIG. 1A shows a schematic diagram of a system (100) enabling users to access the system via client applications. As shown in FIG. 1A, the system may include an application server (110), a developer tool (140), a content database (160) and client applications (170A-170N). Each of these components is described below.

In one or more embodiments of the technology, the software application (including the application server and client applications) may implement processes. Processes may govern the access of data in the content database by users and by the system itself.

As previously described, the system (100), in accordance with one or more embodiments of the technology, includes the application server (110). The client applications (170A-170N) may connect to the application server to enable users to access the content database (160), and to process and manipulate data in the content database in accordance with processes of a deployed software application, executing on the application server. The application server may be executing on a computing device similar to the exemplary computing device shown in FIG. 5, capable of performing at least one of the steps described below with reference to FIGS. 2-4. The computing device on which the application server is executing may include physical or virtual server hardware including at least a processor, memory, persistent storage, and a communication interface. The application server (110) may be on-premises, operated by the legal entity (e.g. the company) providing, using and/or administrating the system (100). Alternatively, the application server may be hosted by a third party, e.g., in a datacenter. Further, the application server may be cloud-based, e.g. the application server may provide its services as a software as a service (SaaS). Although a single application server (110) is shown in FIG. 1A, components of the application server may be distributed over multiple computing devices, either locally or remotely. The application server may be connected to a network (190), thereby enabling the application server to communicate with the client applications (170A-170N), the content database (160) and/or distributed components of the application server.

In one or more embodiments of the technology, the application server (110) performs at least one of the steps described below with reference to FIGS. 2-4. Additional details regarding the application server are provided below, with reference to FIG. 1B.

In one or more embodiments of the technology, the system (100) further includes the developer tool (140). The developer tool may be used by an application designer to develop, modify, build and/or deploy processes of the software application. The developer tool may enable the application designer to graphically generate a process specification, based on which a process may be generated. The process specification may be generated, for example, by graphically selecting elements to be included in the process, including, for example, activity templates. A description of the developer tool (140) is described below, with reference to FIG. 1C. The developer tool, in accordance with an embodiment of the technology, may be executing on the computing device also executing the application server, or it may be executing on any other computing device similar to the exemplary computing device shown in FIG. 5, and that may be connected to the application server via the network (190).

In one or more embodiments of the technology, the system includes the content database (160).

The content database (160), in accordance with one or more embodiments of the technology, stores content that may be business-relevant. The content database may, for example, store inventories, sales figures, technical drawings audio files, video files, images, metadata, health records, social media posts, text documents, any other type of structured, any other type of unstructured data that users may access, or any combination thereof. Accordingly, depending on the nature of data to be stored, the content database may be any type of hierarchical, relational and/or object oriented collection of data, including formats suitable for the storage and retrieval of unstructured data. The content database may be hosted on any type of non-volatile (or persistent) storage, including, for example, a hard disk drive, NAND Flash memory, NOR Flash memory, Magnetic Random Access Memory (M-RAM), Spin Torque Magnetic RAM (ST-MRAM), Phase Change Memory (PCM), or any other memory defined as a non-volatile Storage Class Memory (SCM). Further, the content database may be implemented using a redundant array of independent disks (RAID), network attached storage (NAS), cloud storage, etc. Further, at least some of the content of the data repository may alternatively or in addition be stored in volatile memory, e.g., Dynamic RAM (DRAM), Synchronous DRAM, SDR SDRAM, and DDR SDRAM.

Continuing with the discussion of the system (100) shown in FIG. 1A, the system includes client applications (170A-170N). In one or more embodiments of the technology, a client application may include web browser-executable code (including, e.g., HTML, JavaScript and/or Cascading Style Sheets (CSS) elements), that provides a user interface enabling a user to access and/or manipulate data stored in the content database (160), via the application server (110). A web browser may provide a platform for the execution of the client application (170A-170N), which may be displayed to the user of the computing device as one or more web pages. The web browser may be a software application for retrieving, presenting and traversing content resources (e.g. documents formatted and annotated with hypertext markup language (HTML), JavaScript, CSS, and any language and/or any other language extensions necessary for executing the client application. The web browser may execute on a computing device that a user has access to, and may connect to the application server when a user initiates use of the software application. Alternatively, the client application may be an application executing directly on the computing device, without requiring a web browser. A computing device (not shown in FIG. 1A) on which the application client is executing, either directly, or inside a web browser, may be similar to the exemplary computing device shown in FIG. 5, and may be any type of mobile, desktop, server, embedded, or other hardware.

The components of the system (100), i.e., the application server (110), the developer tool (140), the content database (160) and the computing devices (not shown) hosting the client applications (170A-117N) may communicate using any combination of wired and/or wireless communication protocols. In one embodiment of the technology, the computing devices, the application server, the data repository and the developer tool communicate via a wide area network (190) (e.g., over the Internet), a local area network (e.g., an enterprise or home network), and/or mobile networks, or any other type of network. The communication between the components of the system (100) may include any combination of secured (e.g., encrypted) and non-secured (e.g., un-encrypted) communication. The manner in which the components of the system communicate may vary based on the implementation of the technology.

Figure 1B:
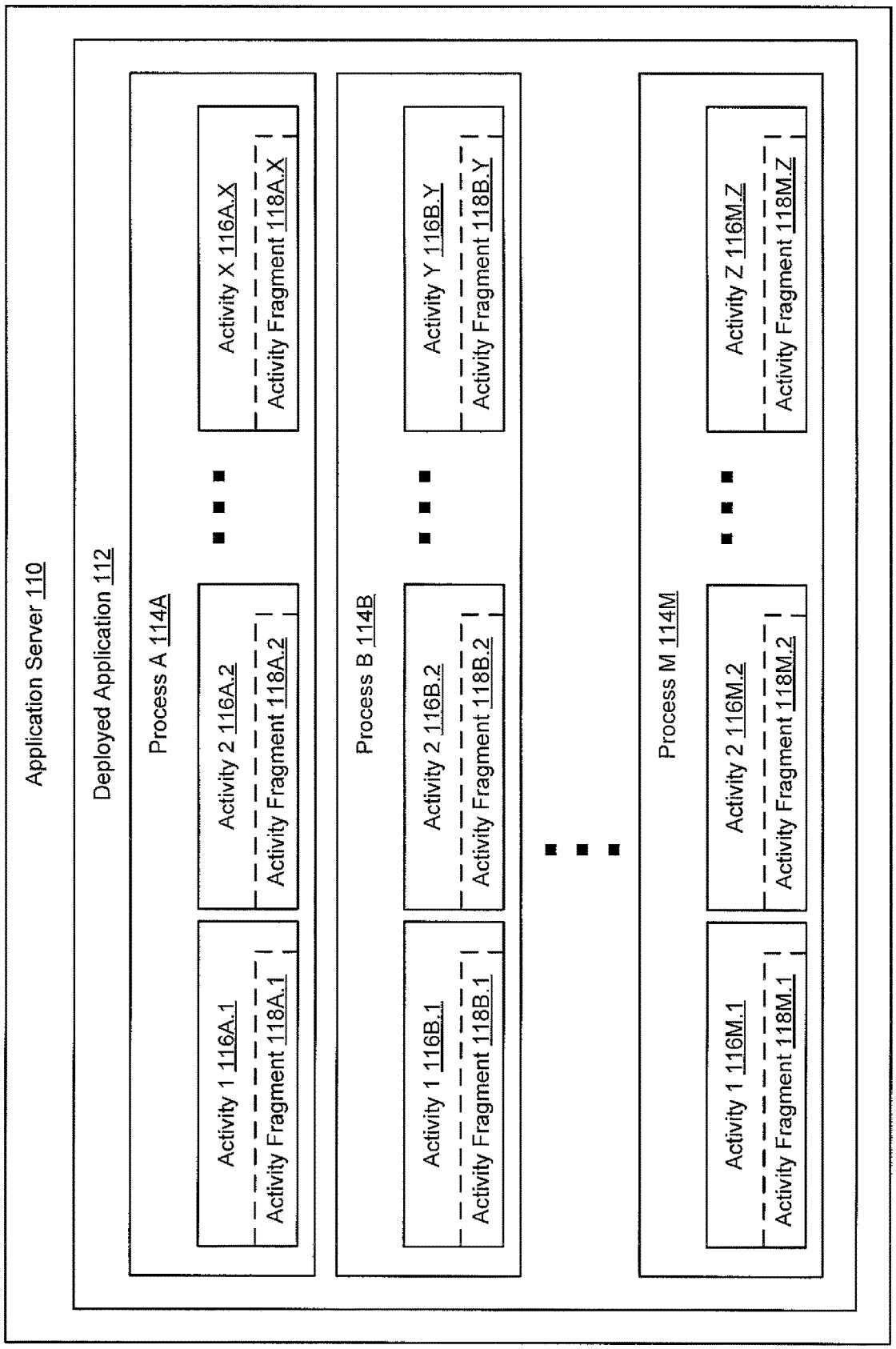

FIG. 1B shows an application server in accordance with one or more embodiments of the technology. The application server (110) hosts and may execute the deployed application (112). The deployed application, in accordance with one or more embodiments of the technology, includes processes A-M (114A-114M). Each process, when executed, may perform a function of the deployed application. In addition to the processes, the deployed application may also include, for example, HTML, JavaScript and CSS instructions that define appearance and function of the software application when accessed and/or executed by a client application.

In one or more embodiments of the technology, the deployed application may have been built by an application designer using the developer tool (140). In one or more embodiments of the technology, the deployed application and/or the configuration of the deployed application may change when processes are added to the application, as described below with reference to FIGS. 2-4, when processes are edited, and when processes are removed from the application.

As noted above, the deployed application (112) includes one or more processes (114A-114M). A process may be a set of software instructions capable of performing a series of tasks in order to complete an operation. A process may be segmented into a set of activities (116A.1-116M.Z), where each activity corresponds to a particular task of the operation. Accordingly each activity may include software instructions enabling the activity to perform a particular task.

An operation, performed by a process (e.g., by process A (114A) may be, for example, the processing of a loan application. The processing of the loan application may include the following tasks (i)-(v):

(i) Completion of loan application form and submission of loan application form. This task may be partially performed by a user of a computing device via a client application. Other aspects of the task may be performed by execution of the deployed application on the application server. For example, user (i.e., the loan applicant) information may be automatically retrieved from the content database (160).

(ii) Review of the submitted loan application. Reviewing the loan application may be performed by execution of the deployed application on the system and may include, for example, checking the loan application for completeness, and assigning a risk score to the loan application. Subsequently the reviewed application may be forwarded to a human supervisor for approval.

(iii) Approval of the loan. The human supervisor may perform a final review of the loan application in view of the risk score and other potentially available data via a client application executing on a computing device (not shown). The supervisor may then authorize the approval of the loan.

(iv) Entry of the loan in a loan database. The loan, including terms and condition and additional documentation may be entered in the loan database which may be part of the content database (160).

(v) Notification of the loan applicant. An email may be automatically sent by the deployed application on the application server to the applicant, confirming that the loan has been approved.

Each of the tasks (i)-(v) may be performed by an action. The combination of all actions (i)-(v) may form the loan application process.

Actions, in accordance with one or more embodiments of the technology, may be performed sequentially and/or in parallel. Actions may further be conditionally executed.

In one or more embodiments of the technology, above described activities (116A.1-116M.Z) may include activity fragments (118A.1-118M.Z). An activity fragment may include software instructions enabling the activity fragment to perform a part of the activity's task. Consider, for example, activity (v) of the previously described loan application process. In activity (v), an email notification is sent to the loan applicant. Some elements of activity (v) are specific to the loan application process. For example, the content of the email is specific to the loan application process. Other elements of activity (v), however, may be applicable to other processes as well. For example, obtaining the email address of the email recipient and identifying and contacting the outgoing email server may be a elements that are applicable in other processes, where an email needs to be sent. These common elements of an activity may therefore be performed by an activity fragment, which may then also be inserted in other activities (of the same process or of a different process), thus eliminating the need for repetitive implementation of these common elements.

Consider, for example, a second process designed to process vacation requests submitted by employees that are users of the system. Regardless of whether the request is approved or not, an email may eventually be sent to the employee. Accordingly, the previously described activity fragment that includes email sending capabilities may be included in activities of the loan application process and in activities of the vacation request process.

In one embodiment of the technology, the use of activity fragments is optional. An activity may thus be configured with or without an activity fragment.

As discussed below, with reference to FIG. 4, an application designer may configure an activity to include an activity fragment by inserting a copy of an activity fragment into the activity or by linking the activity fragment, in accordance with one or more embodiments of the technology. If the activity fragment is linked into the activity, the activity may be updated when the original activity fragment is changed, whereas a copied activity fragment may be independent from the original activity fragment and may therefore not result in updating of the activity when the original activity fragment is changed.

Figure 1C:
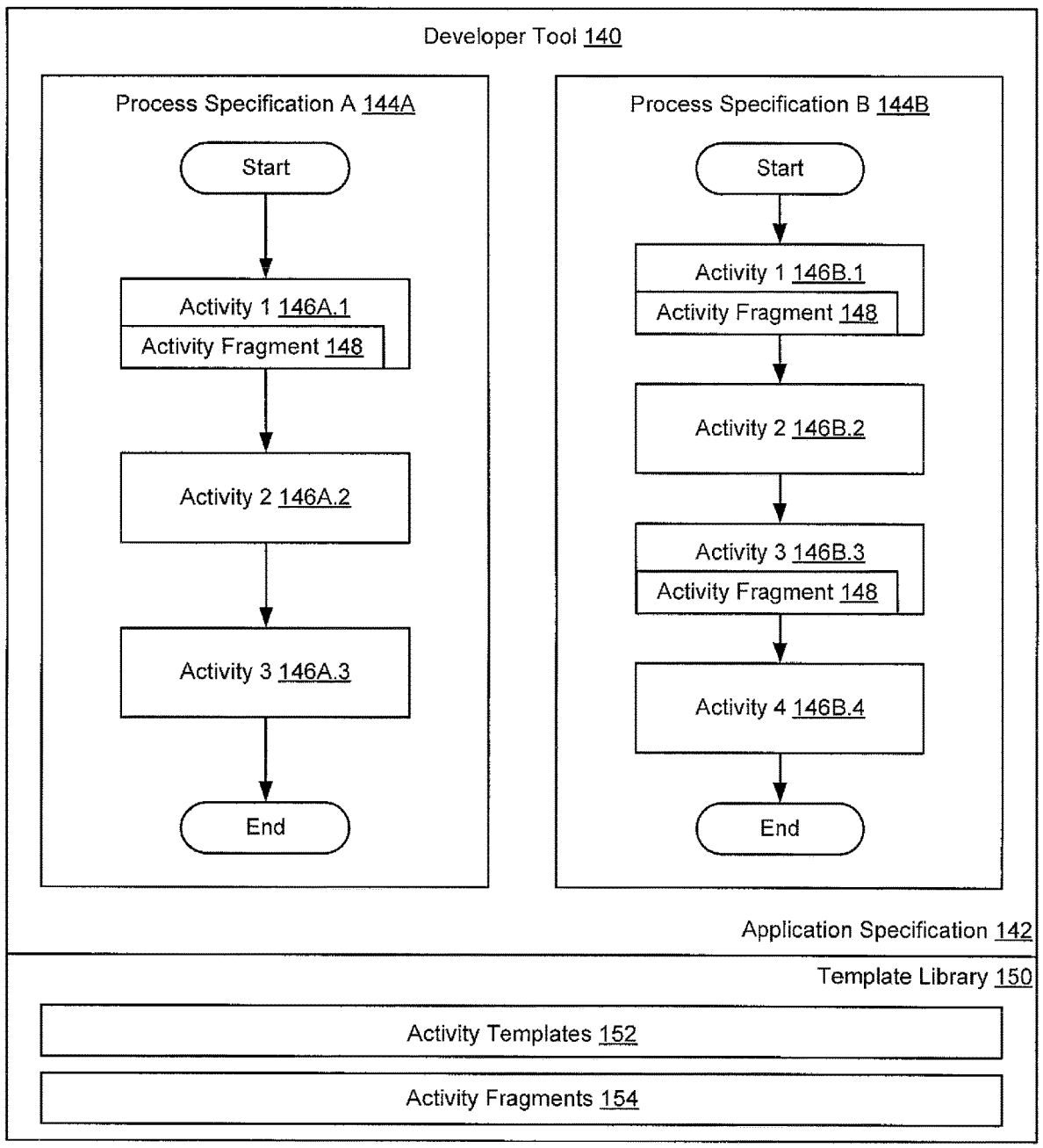

FIG. 1C shows the developer tool (140), in accordance with one or more embodiments of the technology. The developer tool includes an application specification (142), where an application designer may specify the configuration of the application according to which the application (112) may be built and deployed. In the application specification (142), shown in FIG. 1C, two exemplary process specifications (144A, 144B) are shown. Even though two process specifications are shown in FIG. 1C, the application specification (142) may include any number of processes, and may further include other configuration elements to be included in the deployed application (112). Exemplary process specifications A and B (144A, 144B) include sets of activities to be sequentially executed (1.146A.1-1.146A.3 and 1.146B.1-1.146B.4).

In one or more embodiments of the technology, the developer tool (140) further includes a template library (150). The template library may include activity templates (152). The activity templates (152) may include software instructions implementing activities, represented, for example, by graphical symbols, that a system designer may select to be included into a process specification, for example, by dragging the graphical symbol in the template library into a process specification, and by connecting the selected activity template to other elements (e.g. other activity templates) in the process specification, and by configuring the activity template in the process specification. The template library, in accordance with one or more embodiments of the technology, may enable an application designer to compose processes without requiring coding skills.

When the process to be deployed is built, the software instructions associated with the graphical symbol of the activity may be retrieved and may be integrated with other code in order to generate an executable process.

The template library (150) may further include activity templates. The activity fragments (154) may include software instructions implementing activity fragments that may be integrated in an activity. Activity fragments may be represented, for example, by graphical symbols, and/or by activity fragment names. The system designer may thus select an activity fragment to be included in an activity of a process specification by either by dragging the graphical symbol of the activity fragment in the template library into the activity, or by specifying the activity fragment name in the configuration of the activity.

In one or more embodiments of the technology, both activity templates and activity fragments, selected by the application designer to be included in a process specification, may be configured as further described below with reference to FIGS. 3 and 4.

The template library may be a database located on any type of non-volatile storage (as described above), either locally on the computing device hosting the developer tool, or elsewhere. Further, at least some of the content of the template library may alternatively or in addition be stored in volatile memory, e.g., in RAM.

In the exemplary process specifications A and B (144A, 144B), the application designer decided to include the same activity fragment (148) in activity 1 (146A.1) of process specification A (144A) and in activities 1 and 3 (146B.1, 146B.3) of process specification B (144B).

One skilled in the art will recognize that the architecture of the system is not limited to the components shown in FIGS. 1A-1C. For example, the deployed application may include any number of processes of any complexity. Activities in processes may be executed serially and/or in parallel. Further, activities may be conditionally executed. Any number of activity fragments may be included in the processes of the deployed application. Further, a single activity may also include multiple activity fragments, without departing from the technology.

Figure 2:
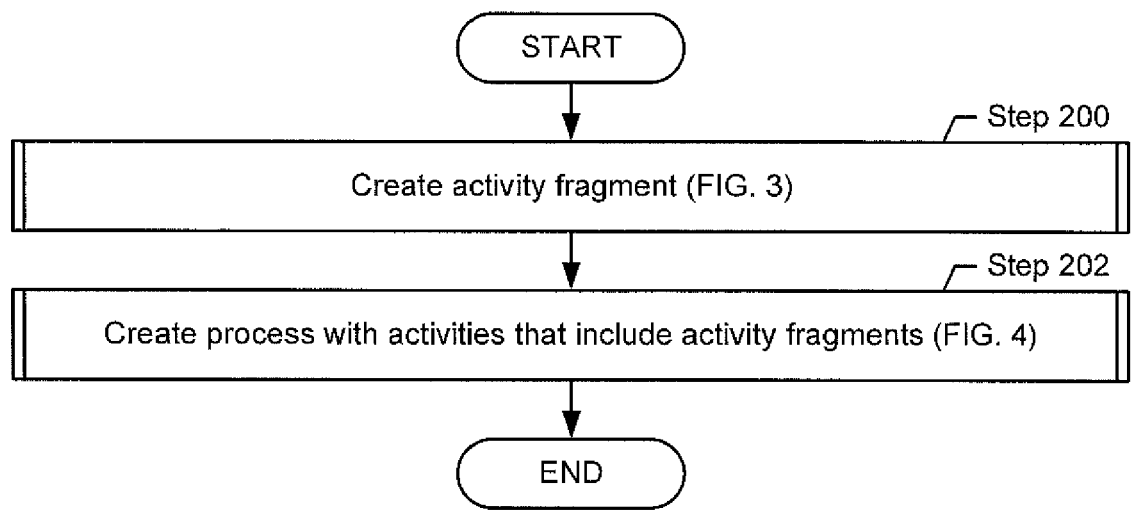
FIGS. 2-4 show flowcharts in accordance with one or more embodiments of the technology.
Figure 3:
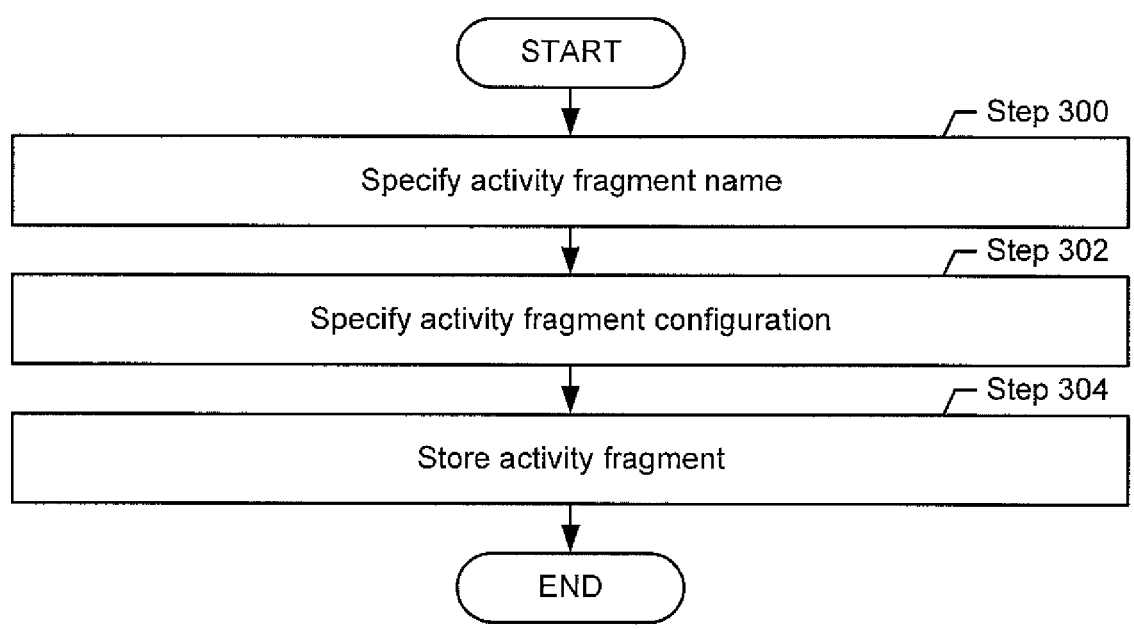
Figure 4:
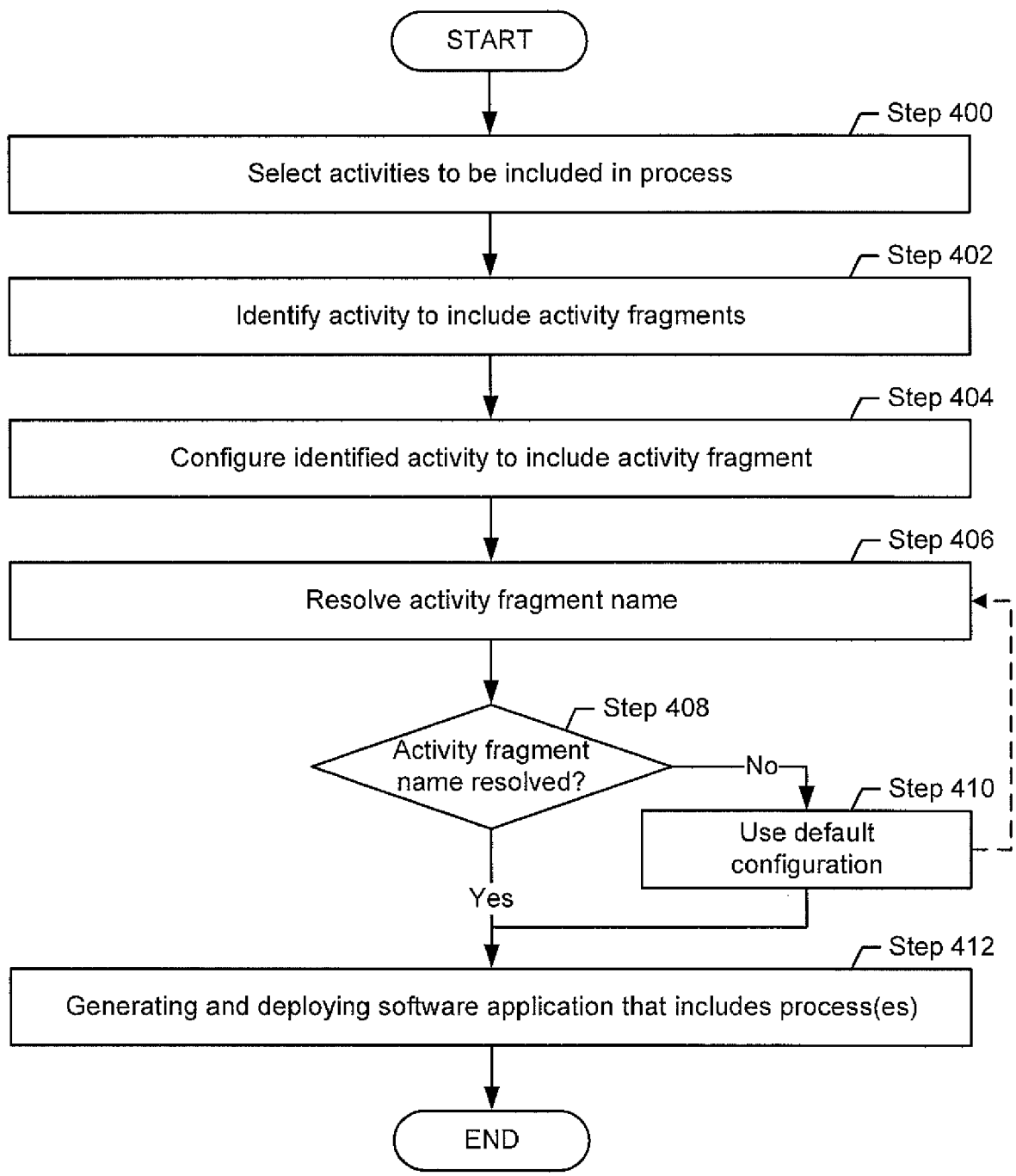

FIGS. 2-4 show flowcharts in accordance with one or more embodiments of the technology. While the various steps in the flowcharts are presented and described sequentially, one of ordinary skill will appreciate that some or all of these steps may be executed in different orders, may be combined or omitted, and some or all of the steps may be executed in parallel. In one embodiment of the technology, the steps shown in FIGS. 2-4 may be performed in parallel with any other steps shown in FIGS. 2-4 without departing from the technology.

FIG. 2 shows a method for creating processes of software applications, using activity fragments.

The processes may be created by selecting, placing, configuring and combining multiple activities and activity fragments in a graphical programming environment. The steps may be performed by an application designer that is familiar with the graphical programming environment but that does not need to possess coding skills.

Turning to FIG. 2, in Step 200, an activity fragment is created by an application designer. Step 200 may be performed each time an activity fragment is created. Further, elements of Step 200 may also be executed when the configuration of an existing activity fragment is updated. In one embodiment of the technology, the method described in FIG. 2 may be performed without executing Step 200, if the activity fragment to be included in an activity already exists. The details of Step 200 are described in FIG. 3.

In Step 202, a process is created by the application designer. The process includes at least one activity that may include an activity fragment. Step 202 may be executed each time a process is created. Further, elements of Step 202 may also be executed when an existing process is modified, for example, by adding, removing and/or editing activities of the process. The details of Step 202 are described in FIG. 4.

FIG. 3 shows a method for creating an activity fragment. An activity fragment may be created top-down and bottom-up. In the top-down approach, an activity fragment may be created by extracting out the elements of the activity that the activity fragment is intended to perform. In the bottom-up approach an activity fragment may be created without extracting elements from any activity.

Turning to FIG. 3, in Step 300, the application designer specifies an activity fragment name for the activity fragment being created. The activity fragment name may be a string selected by the application designer, and may serve as a unique identifier of the activity fragment. In one embodiment of the technology, activity fragment names are used in the steps described in FIG. 4 to identify activity fragments to be included in activities.

In Step 302, the activity fragment configuration is specified. In one embodiment of the technology, configuring the activity fragment configuration includes specifying the type of the activity fragment. The type of the activity fragment may determine the functionality the activity fragment may provide.

Types of the activity fragment may include "database", "email", "file transfer protocol (FTP)", "set process data", "performer", "work queue", "doctrine query language (DQL) query", and activity configurations for commonly occurring activities such as "signoff", "activity complete", "triggering", "notification" and "transition". These types of activity fragments may be capable of performing one or more steps of a corresponding activity. For example, an activity fragment of the type "FTP" may implement methods for performing a file transfer, an activity fragment of the type "performer" may capture a configuration of an activity performer, an activity fragment of the type "DQL query" may implement methods for querying a database using the DQL standard, etc. Depending on the type of activity fragment, selected by the application designer, the activity fragment being created is automatically populated with software instructions in the form of non-transitory computer readable program code that perform a task for which the activity fragment is designed. Further, selection of a particular type of activity fragment, in accordance with an embodiment of the technology, results in the display of parameters and options specific to the type of the activity fragment.

Consider, for example a scenario where the application designer selects to configure an activity fragment of the type "email". The activity fragment is designed to facilitate the sending of email.

The software instructions of the activity thus include non-transitory computer readable code that may automatically contact the email server, may provide the necessary credentials to the email server, and may subsequently provide the content of the email and the destination email address to the server. The parameters to be provided by the application designer include the name of the email server, the credentials to be used when contacting the email server, and the destination email address or a source from where the destination email address may be obtained.

Consider another scenario where the application designer selects to configure an activity fragment of the type "database". The activity fragment is designed to facilitate the reading of database entries from a database. The software instructions of the activity thus include non-transitory computer readable code that may automatically connect to the specified database, may provide a read query. The parameters to be provided by the application designer include the name of the database, the credentials to be used when contacting the database, and the read query in a format compatible with the database being accessed.

Those skilled in the art will appreciate that the technology is not limited to the aforementioned examples of activity fragments.

In one embodiment of the technology, configuring the activity fragment further includes selecting processing options, such as determining the number of threads to be used for the execution of the activity fragment. The configurable parameters and options may depend on the type of the activity fragment. Any configurable parameter or option of the activity fragment may be configured.

In Step 304, the activity fragment is stored. In one embodiment of technology, the activity fragment is stored in the template library of the developer tool, and is ready to be included in an activity.

FIG. 4 shows a method for creating a process by first defining a process specification, and by subsequently building the process according to the process specification.

Turning to FIG. 4, in Step 400, the application designer selects the activities to be included in the process to be created. In one embodiment of the technology, the system designer selects the activities by selecting activity templates from the template library, and by arranging and connecting them in the process specification as necessary to define the process, using the graphical user interface of the developer tool.

In Step 402, the application designer identifies the activity(ies) to include activity fragments. In one or more embodiments of the technology, activities that include common elements, i.e., a configuration in the form of software instructions and/or parameters, that are also included in other activities in the same process or in other processes, may be represented by an activity fragment. For example, as previously described, an activity fragment of the type "database" may read from a database. Accordingly, in Step 402, all activities that require reading from a database may be identified.

In Step 404, the identified activity(ies) are configured to include the activity fragments. In one or more embodiments of the technology, Step 404 may be performed separately for each identified activity. An activity fragment may be inserted into an activity, for example, by specifying the activity fragment name in the configuration properties of the activity. Alternatively, an activity may also be configured not to include the activity fragment. In this case, the application designer may manually specify the configuration of the activity, which the activity would otherwise be obtained from the activity fragment.

Further, in accordance with one or more embodiments of the technology, the application designer may specify whether an application fragment is inserted by either copying the activity fragment into the activity, or by linking the activity fragment. Linking vs. copying an activity fragment may result in different outcomes when, at a later time, the original activity fragment is updated. A linked activity fragment may be updated, based on the changes made to the original activity fragment, whereas a copied activity fragment may be independent from the original activity fragment and may therefore not be updated, unless the process is rebuilt with the updated activity fragment. In one or more embodiments of the technology, if a linked activity fragment is updated at a later time, only Step 412, described below, may need to be repeated in order to update the process to include the updated linked activity fragment.

In Step 406, the activity fragment is resolved from the activity fragment name. In one or more embodiments of the technology, resolution of the activity fragment name results in insertion (or linking) of the configuration of the activity fragment, as previously specified in Step 302, into the activity.

In Step 408, a determination is made about whether the activity fragment name was successfully resolved. An activity with an activity fragment where the name has been successfully resolved may be completely configured and may therefore be enabled to perform an intended task. If a determination is made that the activity fragment name has been resolved, the method may proceed to Step 412. In contrast, if the resolution fails, the configuration of the activity may be incomplete. In this case, the method may proceed to Step 410. Step 408 may be performed separately for each activity fragment inserted into an activity.

In Step 410, a default configuration of the activity is used instead of the configuration of the activity fragment. Using the default configuration may complete the configuration of the activity, even though the resolution of the activity fragment in Step 406 may have failed. In such scenarios, using the default configuration of the scenario may include prompting the developer to provide custom software instructions for the task that were to be performed by the activity fragment. Alternatively, the software development tool may propose another activity fragment that includes substantially the same functionality as the originally selected activity fragment. In this scenario, the process may proceed to Step 406.

In Step 412, a software application that includes one or more processes is built and then the resulting software application that includes the built processes may be deployed. Building the software application may include the steps necessary for establishing an executable process from the process specification created in the previous steps. Building may therefore include gathering all non-transitory computer readable code affiliated with all activities and activity fragments of the process, parameterizing the computer readable code according to the configuration details provided by the application designer, and generating computer executable or interpretable code to be deployed. In one or more embodiments of the technology, the resulting software application may then be deployed to the application server for execution.

Embodiments of the technology may enable the outsourcing of common activities into activity fragments. The activity fragments may then be repeatedly used, wherever the common activity occurs. In activities that include combinations of common and non-common activities, the activity fragment may thus be inserted rather than repeatedly implementing the common activity, whereas the non-common activity of the activity may be implemented separately, and independently from the common activity, thus simplifying and accelerating implementation of processes that include generic activities, while also providing a high degree of flexibility by allowing the non-common activities to be combined with activity fragments in a single activity. In one or more embodiments of the technology, the use of activity fragments may simplify the maintenance of processes in a system. Updating of an activity fragment may cause the updating of all processes where the activity fragment has been inserted.

Consider for example, the reading of employee data from a database. One process requires the employee data for a performance review, another process requires the employee data for a vacation request, and a third process requires the employee data for compliance monitoring purposes. Multiple processes therefore rely on an activity fragment, inserted into activities of the processes in order to read from the database. Then, in the scenario under consideration, an update of the database software results in a different syntax being required for reading employee data from the database. Because all processes rely on the same activity fragment, updating the activity fragment automatically results in the updating of all process using the activity fragment. Accordingly all processes remain fully functional without requiring separate editing of each process.

Further, embodiments of the technology enable an application designer to implement processes using graphical programming. The application designer may be able to compose processes by selecting activities from a template library instead of writing custom code.

Figure 5:
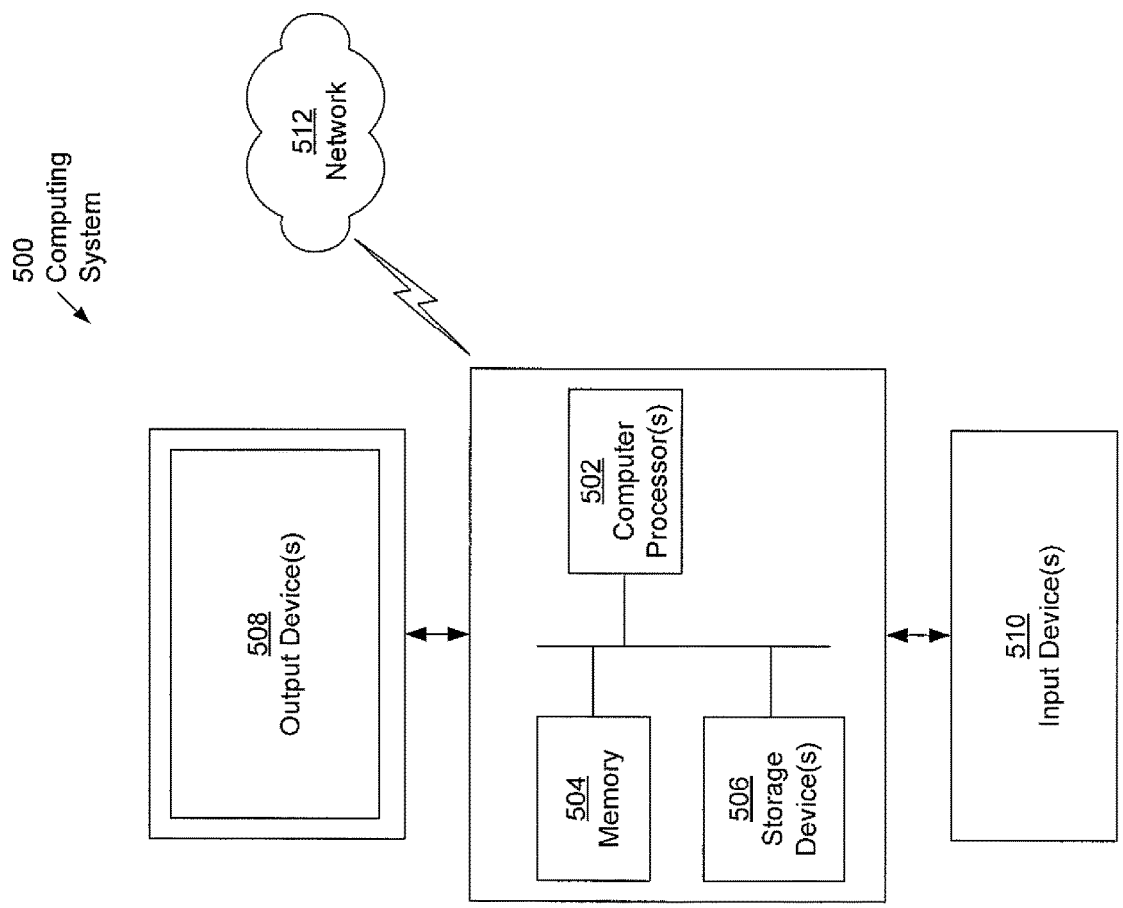
FIG. 5 shows a computing system in accordance with one or more embodiments of the technology.

Embodiments of the technology may be implemented on a computing system. Any combination of mobile, desktop, server, embedded, or other types of hardware may be used. For example, as shown in FIG. 5, the computing system (500) may include one or more computer processor(s) (502), associated memory (504) (e.g., RAM, cache memory, flash memory, etc.), one or more storage device(s) (506) (e.g., a hard disk, an optical drive such as a compact disc (CD) drive or digital versatile disc (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (500) may be located at a remote location and connected to the other elements over a network (512). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for creating software application processes, comprising:
   creating, by a processor, a first activity fragment, the first activity fragment comprising a first activity fragment name and a first activity fragment configuration, wherein creating the first activity fragment comprises receiving from an application designer:
     the first activity fragment name for the first activity fragment;
     an indication of a first activity fragment type for the first activity fragment, the first activity fragment type selected from a plurality of activity fragment types, each activity fragment type of the plurality of activity fragment types associated with software code for that activity fragment type; and
     a parameter to configure the software code for the first activity fragment type;
   storing the first activity fragment;
   obtaining, by the processor, a process specification for a computer-implemented business process executable to perform a series of tasks to perform an operation, the process specification specifying a plurality of activities to perform the series of tasks, each activity in the plurality of activities representing a different type of work to be done as part of the computer-implemented business process;
   obtaining, by the processor, an instruction to configure a first activity of the plurality of activities, the instruction to configure the first activity including an activity fragment identifier;
   making a determination that the activity fragment identifier resolves to the first activity fragment from a plurality of activity fragments; and
   building a software application that includes the computer-implemented business process, the computer-implemented business process including the first activity, wherein building the software application comprises:
     based on the determination that the activity fragment identifier resolves to an identifier for the first activity fragment, building the first activity to include the software code for the first activity fragment type configured according to the parameter.

2. The method of claim 1, wherein the first activity fragment configuration comprises:
   the first activity fragment type;
   software instructions specific to the first activity fragment type; and
   a set of activity fragment parameters specific to the first activity fragment type.

3. The method of claim 1, further comprising:
   based on the determination that the activity fragment identifier resolves to the first activity fragment, linking the first activity to the first activity fragment.

4. The method of claim 1, further comprising:
   based on the determination that the activity fragment identifier resolves to the first activity fragment, copying the first activity fragment into the first activity.

5. The method of claim 1, wherein creating the first activity fragment comprises receiving a processing option for the first activity fragment from the application designer.

6. The method of claim 5, wherein the processing option comprises a number of threads to be used for execution of the first activity fragment.

7. A non-transitory computer readable medium (CRM) storing computer-executable instructions for creating software application processes, the computer-executable instructions comprising instructions for:
creating a first activity fragment, the first activity fragment comprising a first activity fragment name and a first activity fragment configuration, wherein creating the first activity fragment comprises receiving from an application designer:
the first activity fragment name for the first activity fragment;
an indication of a first activity fragment type for the first activity fragment, the first activity fragment type selected from a plurality of activity fragment types, each activity fragment type of the plurality of activity fragment types associated with software code for that activity fragment type; and
a parameter to configure the software code for the first activity fragment type;
storing the first activity fragment;
obtaining a process specification for a computer-implemented business process executable to perform a series of tasks to perform an operation, the process specification specifying a plurality of activities to perform the series of tasks, each activity in the plurality of activities representing a different type of work to be done as part of the computer-implemented business process;
obtaining an instruction to configure a first activity of the plurality of activities, the instruction to configure the first activity including an activity fragment identifier; and
building a software application that includes the computer-implemented business process, the computer-implemented business process including the first activity, wherein building the software application comprises:
based on a determination that first activity fragment identifier resolves to an identifier for the first activity fragment, building the first activity to include the software code for the first activity fragment type configured according to the parameter.

8. The computer readable medium of claim 7, wherein the first activity fragment configuration comprises:
the first activity fragment type;
software instructions specific to the first activity fragment type; and
a set of activity fragment parameters specific to the first activity fragment type.

9. The computer readable medium of claim 7, wherein the computer-executable instructions comprise instructions for:
based on the determination that the activity fragment identifier resolves to the first activity fragment, linking the first activity to the first activity fragment.

10. The computer readable medium of claim 7, wherein the computer-executable instructions comprise instructions for:
based on the determination that the activity fragment identifier resolves to the first activity fragment, copying the first activity fragment into the first activity.

11. The computer readable medium of claim 7, wherein creating the first activity fragment comprises receiving a processing option for the first activity fragment from the application designer.

12. The computer readable medium of claim 11, wherein the processing option comprises a number of threads to be used for execution of the first activity fragment.

13. The computer readable medium of claim 7, wherein the computer-executable instructions comprise instructions for:
based on a determination that the activity fragment identifier does not resolve to any activity fragment in a plurality of activity fragments, configuring the first activity according to a default configuration.

14. The computer readable medium of claim 7, wherein the computer-executable instructions comprise instructions for:
based on a determination that the activity fragment identifier does not resolve to any activity fragment in a plurality of activity fragments, configuring the first activity according to a second activity fragment.

15. A system for creating software application processes, comprising:
a computer processor; and
a developer tool, the developer tool executable on the processor to:
create a first activity fragment, the first activity fragment comprising a first activity fragment name and a first activity fragment configuration, wherein creating the first activity fragment comprises receiving from an application designer:
the first activity fragment name for the first activity fragment;
an indication of a first activity fragment type for the first activity fragment, the first activity fragment type selected from a plurality of activity fragment types, each activity fragment type of the plurality of activity fragment types associated with software code for that activity fragment type; and
a parameter to configure the software code for the first activity fragment type;
store the first activity fragment;
obtain a process specification for a computer-implemented business process executable to perform a series of tasks to perform an operation, the process specification specifying a plurality of activities to perform the series of tasks, each activity in the plurality of activities representing a different type of work to be done as part of the computer-implemented business process;
obtain an instruction to configure a first activity of the plurality of activities, the instruction to configure the first activity including an activity fragment identifier; and
based on a determination that the activity fragment identifier resolves to an identifier for the first activity fragment in a plurality of activity fragments:
associate the first activity fragment with the first activity; and
build the first activity to include the software code for the first activity fragment type configured according to the parameter; and
deploy the software application on an application server, the software application comprising the computer-implemented business process, the computer-implemented business process comprising the first activity.

16. The system of claim 15, wherein the developer tool is executable on the processor to:

based on a determination that the activity fragment identifier does not resolve to any of the plurality of activity fragments, configure the first activity according to a default configuration.

17. The system of claim 15, wherein the developer tool is executable on the processor to:
based on a determination that the activity fragment identifier does not resolve to any of the plurality of activity fragments, configure the first activity according to a configuration of a second activity fragment.

18. The system of claim 15, wherein the first activity fragment configuration comprises:
the first activity fragment type;
software instructions specific to the first activity fragment type; and
a set of activity fragment parameters specific to the first activity fragment type.

19. The system of claim 15, wherein the development tool is executable to:
based on the determination that the activity fragment identifier resolves to the first activity fragment, linking the first activity to the first activity fragment.

20. The system of claim 15, wherein the development tool is executable to:
based on the determination that the activity fragment identifier resolves to the first activity fragment, copying the first activity fragment into the first activity.

\* \* \* \* \*